(12) United States Patent
Bourdis et al.

(10) Patent No.: US 12,131,544 B2
(45) Date of Patent: Oct. 29, 2024

(54) METHOD FOR CAPTURING MOTION OF AN OBJECT AND A MOTION CAPTURE SYSTEM

(71) Applicant: PROPHESEE, Paris (FR)

(72) Inventors: Nicolas Bourdis, Puteaux (FR); Davide Migliore, Paris (FR)

(73) Assignee: PROPHESEE, Paris (FR)

( * ) Notice: Subject to any disclaimer, the term of this patent is extended or adjusted under 35 U.S.C. 154(b) by 321 days.

(21) Appl. No.: 17/611,021

(22) PCT Filed: May 14, 2020

(86) PCT No.: PCT/EP2020/063489
§ 371 (c)(1),
(2) Date: Nov. 12, 2021

(87) PCT Pub. No.: WO2020/229612
PCT Pub. Date: Nov. 19, 2020

(65) Prior Publication Data
US 2022/0245914 A1 Aug. 4, 2022

(30) Foreign Application Priority Data

May 16, 2019 (EP) ..................................... 19305624

(51) Int. Cl.
*G06V 10/143* (2022.01)
*G06T 7/246* (2017.01)
(Continued)

(52) U.S. Cl.
CPC .............. *G06V 20/52* (2022.01); *G06T 7/246* (2017.01); *G06V 10/143* (2022.01); *G06V 20/90* (2022.01);
(Continued)

(58) Field of Classification Search
CPC ...... G06V 20/52; G06V 20/90; G06V 10/143; G06V 10/245; G06T 7/246; G06T 2207/10016; G06T 2207/30204
See application file for complete search history.

(56) References Cited

U.S. PATENT DOCUMENTS

| 8,941,589 B2 * | 1/2015 | Csaszar | G06V 40/107 345/158 |
| 8,965,898 B2 * | 2/2015 | Aman | G01S 17/66 707/913 |

(Continued)

OTHER PUBLICATIONS

Keskin et al., "Localization via Visible Light Systems," *Proceedings of the IEEE* 106(6):1063-1088, Jun. 2018.

(Continued)

*Primary Examiner* — Gregory M Desire (57) ABSTRACT

A method for capturing motion of an object, the method comprising: installing at least one marker on the object; bringing the object having the at least one marker installed thereon in an acquisition volume; arranging at least two event-based light sensors such that respective fields of view of the at least two event-based light sensors cover the acquisition volume, wherein each event-based light sensor has an array of pixels; receiving events asynchronously from the pixels of the at least two event-based light sensors depending on variations of incident light from the at least one marker sensed by the pixels; and processing the events to position the at least one marker within the acquisition volume and capture motion of the object.

12 Claims, 4 Drawing Sheets

(51) Int. Cl.
*G06V 10/75* (2022.01)
*G06V 20/52* (2022.01)
*G06V 20/90* (2022.01)
*G06V 10/24* (2022.01)

(52) U.S. Cl.
CPC .............. *G06T 2207/10016* (2013.01); *G06T 2207/30204* (2013.01); *G06V 10/245* (2022.01)

(56) References Cited

U.S. PATENT DOCUMENTS

| | | | | |
|---|---|---|---|---|
| 9,019,349 | B2* | 4/2015 | Richardson | H04N 23/66 348/47 |
| 9,628,777 | B2 | 4/2017 | Benosman et al. | |
| 10,092,220 | B2* | 10/2018 | Mauro | G06T 7/70 |
| 10,095,928 | B2* | 10/2018 | Beall | G06T 7/70 |
| 10,261,183 | B2* | 4/2019 | Smits | G01S 7/4868 |
| 10,460,208 | B1* | 10/2019 | Atsmon | G06V 20/64 |
| 10,481,679 | B2* | 11/2019 | Sevostianov | A63F 13/25 |
| 10,591,605 | B2* | 3/2020 | Smits | G01S 17/42 |
| 10,706,566 | B2* | 7/2020 | Perry | G06T 7/292 |
| 10,949,980 | B2* | 3/2021 | Sevostianov | G06T 7/246 |
| 2001/0024512 | A1 | 9/2001 | Yoronka et al. | |

OTHER PUBLICATIONS

Posch et al., "A QVGA 143 dB Dynamic Range Frame-Free PWM Image Sensor With Lossless Pixel-Level Video Compression and Time-Domain CDS," *IEEE Journal of Solid-State Circuits* 46(1):259-275, Jan. 2011.

Carneiro et al., "Event-based 3D reconstruction from neuromorphic retinas," *Neural Networks* 45:27-38, 2013.

Censi et al., "Low-latency localization by Active LED Markers tracking using a Dynamic Vision Sensor," 2013 IEEE/RSJ International Conference on Intelligent Robots and Systems (IROS), Nov. 3-7, 2013, Tokyo, Japan, pp. 891-898.

Müller et al., "Self-calibrating Marker Tracking in 3D with Event-Based Vision Sensors," from Villa et al. (Eds.): ICANN 2012, Part I, LNCS 7552, pp. 313-321, 2012.

Nakazato et al., "Wearable Augmented Reality System Using Invisible Visual Markers and an IR Camera," Proceedings of the 2005 Ninth IEEE International Symposium on Wearable Computers (ISWC '05), 2 pages.

* cited by examiner

METHOD FOR CAPTURING MOTION OF AN OBJECT AND A MOTION CAPTURE SYSTEM

The present invention relates to a method for capturing motion of an object and a motion capture system.

BACKGROUND

Machine vision is a field that includes methods for acquiring, processing, analyzing and understanding images for use in wide type of applications such as for example security applications (e.g., surveillance, intrusion detection, object detection, facial recognition, etc.), environmental-use applications (e.g., lighting control), object detection and tracking applications, automatic inspection, process control, and robot guidance etc. Therefore, machine vision can be integrated with many different systems.

Among these above-mentioned applications, motion detection and tracking is useful in detecting the accurate position of a moving object in a scene, especially for Computer-Generated Imagery (CGI) solutions, such as video games, films, sports, television programs, virtual reality and augmented reality, movement science tools and simulators.

Accordingly, localization systems are commonly used for this purpose, which are also known as motion capture (mo-cap), to detect and estimate the position of the objects equipped with markers.

In the art, several commercial motion capture systems, such as Vicon's and OptiTrack's, use multiple frame-based cameras equipped with IR lighting to detect passive retro-reflective markers. The exposition settings of these cameras are configured to make the markers stand-out in the video streams, so that they may be tracked easily.

These cameras have a fixed framerate, typically around 120-420 fps, which leads to two important limitations. First, the acquisition process generates a lot of unnecessary data which must still be processed to detect the markers, leading to an unnecessary usage of computational power and hence a limitation on the latency reachable by the system. Second, the fixed framerate, which can be seen as the sampling frequency of the positions of objects, leads to a limitation on the dynamics which can be captured by the system with good fidelity.

Moreover, in the art, Keskin, M. F et al. present in their article "Localization via Visible Light Systems". *Proceedings of the IEEE*, 106(6), 1063-1088" a survey on localization techniques from visible light systems. They mention many articles from the scientific literature describing solutions (e.g. based on signal strength, time of arrival, angle of arrival, etc.) to the problem of estimating the position of light receivers from the signal received from calibrated reference LEDs, which can be identified via their intensity modulation pattern. In particular, they discuss the use of photo-detectors or conventional imaging sensors as light receivers. The limitations of conventional imaging sensors have been mentioned above. Photo-detectors also have a fixed yet much higher data rate An object of the present invention is to provide a new method for capturing motion of an object, adapted to detect and track the pose and orientation of an object with a great accuracy and/or with a high temporal resolution to capture fast movements with high fidelity.

SUMMARY

A method for capturing motion of an object is proposed. The method comprises:
  installing at least one marker on the object;
  bringing the object having the at least one marker installed thereon in an acquisition volume;
  arranging at least two event-based light sensors such that respective fields of view of the at least two event-based light sensors cover the acquisition volume, wherein each event-based light sensor has an array of pixels;
  receiving events asynchronously from the pixels of the at least two event-based light sensors depending on variations of incident light from the at least one marker sensed by the pixels; and
  processing the events to position the at least one marker within the acquisition volume and capture motion of the object.

In an embodiment, processing the events may comprise:
  determining that events received from respective pixels of the at least two event-based light sensors relate to a common marker based on detection of a timing coincidence between said events; and
  determining position of the common marker based on 2D pixel coordinates of the respective pixels from which the events having the detected timing coincidence therebetween are received.

In particular, the timing coincidence can be detected between events having a time difference of less than 1 millisecond between them.

In addition, the method may further comprise mapping 3D coordinates in the acquisition volume to 2D pixel coordinates in each of the event-based light sensors, wherein determining position of the common marker comprises obtaining 3D coordinates of the common marker that are mapped to the 2D pixel coordinates of the respective pixels from which the events having the detected timing coincidence therebetween are received.

In another embodiment, the at least one marker comprises an active marker adapted to emit light. As an example, the active maker may emit blinking light with a preset blinking frequency or a pseudo random blinking pattern.

Alternatively, the at least one marker comprises a passive reflector, and the method further comprises illuminating the acquisition volume with external light, so that the passive reflector is adapted to reflect light from the external light, such as infrared light.

Furthermore, the at least one marker may be configured to emit or reflect light having wavelength characteristics and the at least two event-based light sensors are provided with optical filters to filter out light not having the wavelength characteristics.

In an embodiment, the at least two event-based light sensors are fixed to a common rigid structure, such as a rigid frame, which can be moveable following the movement path of a moving object, so as to prevent the object from escaping the fields of view of the cameras.

There is also provided a motion capture system comprising:
  at least one marker to be carried by an object in an acquisition volume;
  at least two event-based light sensors having respective fields of view covering the acquisition volume, wherein each event-based light sensor has an array of pixels configured to asynchronously generate events depending on variations of incident light from the at least one marker sensed by the pixels; and a computing device coupled to the at least two event-based light sensors to process the events to position the at least one marker within the acquisition volume and capture motion of the object.

The above-mentioned method and system provide a significant improvement of the latency and temporal resolution of localization measurements, which allows higher fidelity movement capture at precision of the order of microseconds and millimeters, while greatly reducing required computational power. This makes the motion capture system according to the present invention more flexible and suited to more applications, such as augmented reality (AR) or virtual reality (VR) as well as motion capture for sport analysis, cinema and video games.

BRIEF DESCRIPTION OF THE DRAWINGS

Other features and advantages of the present invention will appear in the description hereinafter, in reference to the appended drawings, where:

FIGS. 4a to 4f illustrate an example of detecting and tracking a marker in 2D coordinates; and FIGS. 5a to 5e illustrate another example of detecting and tracking a marker in 3D coordinates.

DESCRIPTION OF EMBODIMENTS

Figure 1:
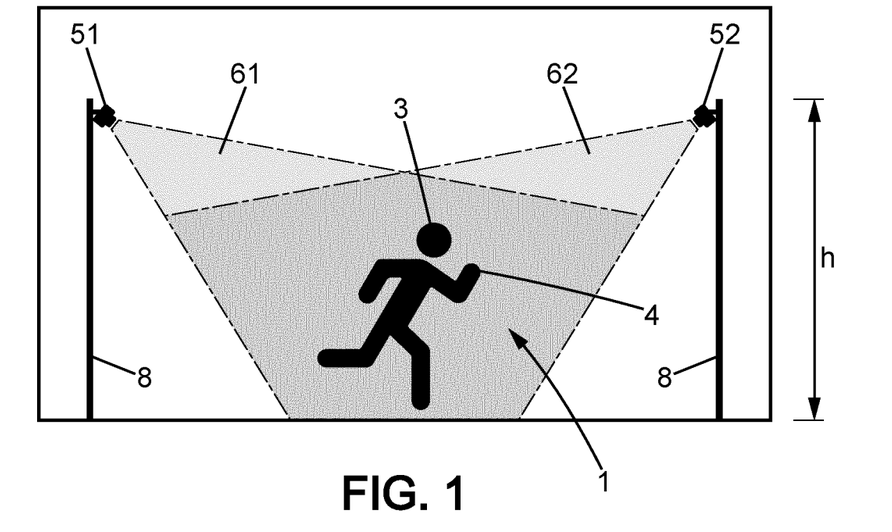
FIG. 1 illustrates an overall setup of the system according to the invention.

FIG. 1 illustrates the overall setup of the motion capture system of the invention.

The system comprises at least two event-based light sensors 51, 52, which may respectively generate events depending on variations of light in the scene where the event-based light sensors observe.

In the illustrated embodiment, the event-based light sensors 51, 52 are attached to a common rigid structure, such as a rigid frame 8 at a height h above the ground, and they observe a scene with their fields of view 61, 62 partially overlapped in an acquisition volume 1, which is adapted to contain an object 3 that can be observed and sensed by the event-based light sensors 51, 52. In particular, the fields of view 61, 62 are overlapped, so that the object can be observed in both event-based light sensors simultaneously. In other words, the event-based light sensors 51, 52 are arranged around the periphery of the acquisition volume once they are set, with their fields of view 61, 62 covering the acquisition volume 1 where the object 3 is located.

The object 3 may be a person, other moving object, or plurality of the formers, whose position, posture and orientation are to be detected and tracked. The object 3 carries at least one marker 4. Typically, a plurality of markers is fixed on the surface of the object 3. The object 3 is positioned in the acquisition volume 1, so that the marker can be observed and sensed by the event-based light sensors 51, 52.

The marker 4 is designed to be easily detectable by the event-based light sensors 51, 52. It may emit or reflect continuous or varying light that can be detected by the event-based light sensors which then generate the events accordingly.

With such an arrangement, the marker 4 in the acquisition volume 1 can be observed by the event-based light sensors 51, 52 which generate events corresponding to the variations of incident light from the marker 4.

Furthermore, the system includes a computing device, not shown in FIG. 1, such as a desktop, a laptop computer or a mobile device, which is coupled with the event-based light sensors to receive the events and process these events with computer vision algorithms to detect and track the markers. The position of the markers 4 and motion of the object 3 in the acquisition volume 1 can thus be acquired.

Figure 2:
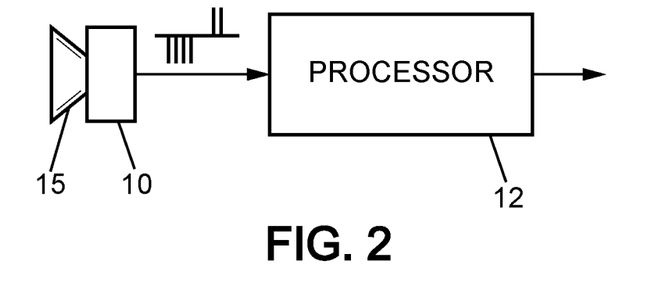
FIG. 2 is a block diagram of an event-based light sensor adapted to implementation of the invention.

FIG. 2 shows an event-based light sensor which comprises an event-based asynchronous vision sensor 10 placed facing a scene and receiving the light flow of the scene through optics for acquisition 15 comprising one or several lenses, which provides a field of view depending on the optics characteristics of the lenses. The sensor 10 is placed in the image plane of the optics for acquisition 15. It comprises an array of sensing elements, such as photosensitive elements, organized into a matrix of pixels. Each sensing element corresponding to a pixel produces successive events signal depending on variations of light in the scene.

The event-based light sensor comprises a processor 12 which processes the event signal originating from the sensor 10, i.e. the sequences of events received asynchronously from the various pixels, and then forms and outputs event-based data. A hardware implementation of the processor 12 using specialized logic circuits (ASIC, FPGA, . . . ) or chip coupled with the sensor 10 is also possible.

In particular, the asynchronous sensor 10 carries out an acquisition to output a signal which, for each pixel, may be in the form of a succession of instants $t_k$ (k=0, 1, 2, . . . ) at which an activation threshold Q is reached. Each time this luminance increases by a quantity equal to the activation threshold Q starting from what it was in time $t_k$, a new instant $t_{k+1}$ is identified and a spike is emitted at this instant $t_{k+1}$. Symmetrically, each time that the luminance observed by the pixel decreases by the quantity Q starting from what it was in time $t_k$, a new instant $t_{k+1}$ is identified and a spike is emitted at this instant $t_{k+1}$. The signal sequence for the pixel includes a succession of spikes positioned over time at instants $t_k$ depending on the light profile for the pixel. Without limitation, the output of the sensor 10 is then in the form of an address-event representation (AER). In addition, the signal sequence typically includes a luminance attribute corresponding to a variation of incident light.

The activation threshold Q can be fixed or can be adapted as a function of the luminance. For example, the threshold can be compared to the variations in the logarithm of the luminance for generating events when exceeded. Alternatively, different thresholds can be respectively set for increasing luminance activations and for decreasing luminance activations.

By way of example, the sensor 10 can be a dynamic vision sensor (DVS) of the type described in "A 128×128 120 dB 15 µs Latency Asynchronous Temporal Contrast Vision Sensor", P. Lichtsteiner, et al., IEEE Journal of Solid-State Circuits, Vol. 43, No. 2, February 2008, pp. 566-576, or in patent application US 2008/0135731 A1. The dynamics of a retina (minimum duration between the action potentials) can be approached with a DVS of this type. The dynamic behaviour surpasses that of a conventional video camera that has a realistic sampling frequency. When a DVS is used as the event-based sensor 10, data pertaining to an event originating from a pixel include the address of the pixel, a time of occurrence of the event and a luminance attribute corresponding to a polarity of the event, e.g. +1 if the luminance increases and −1 if the luminance decreases.

Another example of an asynchronous sensor 10 that can be used advantageously in the context of this invention is the asynchronous time-based image sensor (ATIS) of which a description is given in the article "A QVGA 143 dB Dynamic Range Frame-Free PWM Image Sensor With Lossless Pixel-Level Video Compression and Time-Domain CDS", C. Posch, et al., IEEE Journal of Solid-State Circuits, Vol. 46, No. 1, January 2011, pp. 259-275. When an ATIS is used as the event-based sensor 10, data pertaining to an event originating from a pixel include the address of the pixel, a time of occurrence of the event and a luminance attribute corresponding to an estimated value of the absolute luminance.

The markers 4 can be passive, i.e. emitting no light on their own.

For instance, a retro-reflective reflector reflects external illumination light, e.g. from external infrared light sources. The reflected light causes the event-based light sensor to generate events as mentioned above.

Alternatively, the marker 4 can also be active, i.e. using a power source and emitting light, for example visible or near-infrared light, which may cause the event-based light sensor to generate events.

Since the event-based light sensors have high temporal resolution, they make it possible to use of a much greater variety of light signals, compared to conventional frame-based cameras. In particular, the light reflected from or emitted by the markers may exhibit specific temporal behaviours, which could then be decoded for various purposes. For instance, using blinking LEDs with specific blinking frequencies enables identifying the markers reliably, making it easier to distinguish similar-looking objects or to disambiguate the orientation of a symmetrical pattern.

Moreover, since the event-based light sensor generates events depending on the variations of light received by the sensing element from the marker that appears in the field of view of the sensor, it is possible to configure the event-based light sensors to detect the events exclusively generated by pre-designed markers. This can be achieved by configuring the marker to emit or reflect light having wavelength characteristics, for example in certain pre-set range of wavelength, and adding optical filters to the light sensors so as to filter out light not having the pre-set range of wavelength from the markers. Alternatively, this can also be achieved by configuring the event-based light sensors for sensing only strong light variations, those induced by the markers, while maintaining a fast reaction time.

Figure 3:
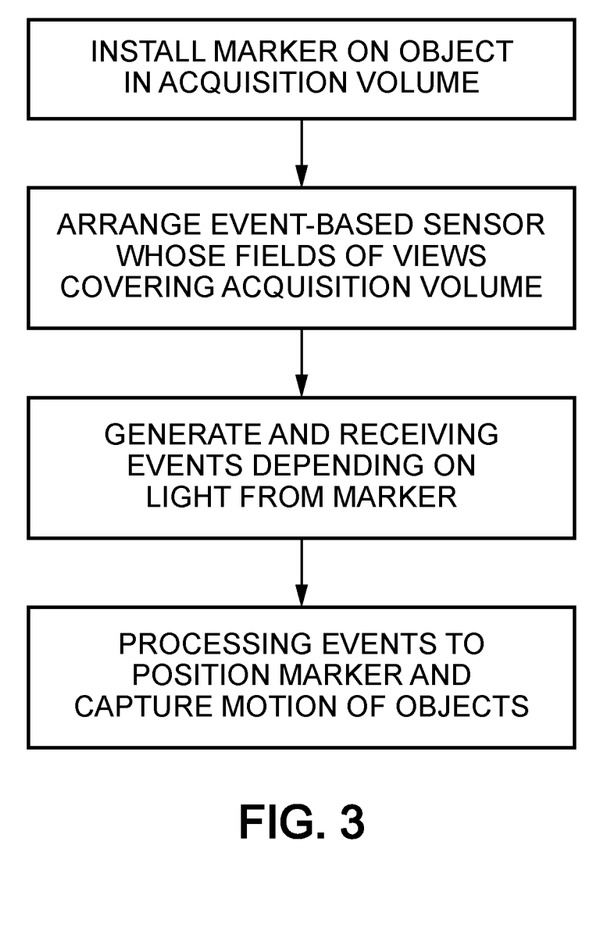
FIG. 3 is a flowchart of an illustrative method according to the invention.

Referring to FIG. 3, now we discuss hereinafter a method for capturing motion of an object by means of the motion capture system mentioned above.

In the beginning (S1), at least one marker as mentioned above is installed on the surface of an object, such as the body of a performer or sportsman. The object with the marker is located in an acquisition volume. The markers are active or passive, as discussed above, and designed to facilitate their detection by event-based light sensors. Each marker can be fixed on any part of the object, and in case of human beings, it is usually attached to head/face, fingers, arms and legs.

Meanwhile (S2), at least two event-based light sensors are separately arranged around the periphery of the acquisition volume. The event-based light sensors may be fixed to a common rigid structure, so that the relative position between the event-based light sensors is fixed.

The light sensors are precisely arranged, and their fields of view cover the acquisition volume from different angles. The acquisition volume is a space which may contain the object, such as the performer or sportsman, or other objects that move in the acquisition volume. The size and shape of the acquisition volume is defined according to the application, a particular arrangement is a cube, such as a room, or a sphere, in which an object can freely move, and its motion will be captured. The acquisition volume may move, for example if the common rigid structure on which the event-based light sensors are fixed is a movable structure.

With such an arrangement, the object in the acquisition volume can be observed and thus events can be asynchronously generated by the pixels on the event-based sensors in response to the variations of incident light from the fields of view. In an example, two event-based light sensors are set above the height of the object with their fields of view titled down towards the object.

In addition, optionally, the light sensors can be configured properly to achieve a high temporal resolution and to filter out light not having certain wavelength characteristics, which guarantees that the events are exclusively generated by the concerned object, hence reducing the required computational power and the latency to a minimum.

During the setting of the event-based light sensors, it is also possible to calibrate them to estimate the parameters allowing to map 3D coordinates in the acquisition volume into 2D pixel coordinates, i.e. floating-point pixel addresses, in any of the event-based light sensor.

For this purpose, as an example, a known pattern of markers, such as an asymmetric grid of blinking LEDs, is moved exhaustively across the acquisition volume and detected by each event-based light sensor. The event-based light sensors perceive the LEDs, recognize the blinking frequencies, and associate each 2D measurements to each element of the 3D structure. 3D points expressed in the coordinate frame of the acquisition volume then can be mapped into their 2D projections in the pixel coordinates of any of event-based light sensor, resulting in a set of 2D trajectories formed by events as observed by pixels in each sensor. These 2D trajectories combined with the knowledge of the 3D dimensions of the pattern then enable estimating the posture and orientation of each light sensor, via a classical bundle adjustment technique.

Knowing the parameters mapping 3D coordinates into pixels coordinates, models can be inverted to infer the 3D coordinates from a set of corresponding 2D observations, for instance via a classical triangulation approach. In this regard, it is preferable to use more event-based light sensors, thus enabling higher triangulation accuracy for subsequent positioning.

Afterwards (S3), the event-based light sensors generate events according to the variations of incident light from the markers. The events received at step S3 by the processor 12 are processed (S4) by means of stereo 3D reconstruction, so as to position the marker in the 3D acquisition volume.

Since the data generated by event-based light sensors are substantively different from the ones generated by frame-based cameras, a different method for detecting and tracking marker is adapted with specific algorithms in the present invention. These algorithms leverage the event-based paradigm and the high-temporal resolution to reduce the computational complexity to a minimum.

An exemplary algorithm for detecting and tracking markers in event-based data is now discussed. When moving in front of an event-based light sensor, a marker continuously triggers events from pixels of the event-based light sensors. Accordingly, the events in response to the moving marker are generated in each event-based light sensor and are processed separately, for example, by the global processing platform or by a local dedicated embedded system, so as to detect and track marker 2D positions in each event-based light sensor.

Afterwards, these events including simultaneous events from the same marker generated by each event-based light sensor are paired or associated to find their correspondences on the basis of temporal and/or geometric characteristic, so that the 3D position of the marker can be detected and tracked.

For example, for active markers, the events received from respective pixels of each event-based light sensors will be determined if they relate to a common marker on the basis of detection of a timing coincidence between these events from different event-based light sensors. The timing coincidence may be detected between events having a time difference of less than 1 millisecond between them. For passive markers, classical geometric epipolar constraints can be used to associate the events on each event-based light sensor to a common marker. After the events are paired, their correspondences are then processed to position the marker.

In an exemplary example, several event-based light sensors C1, C2 . . . Cn are arranged to detect and track a marker in response to the marker's movement.

When the marker is present in the fields of view of the light sensors, the light sensor C1 generates event $ev(i_{c1}, t_1)$ for a pixel having an address expressed as index $i_{c1}$ at coordinates $(x_{ic1}, y_{ic1})$ in the pixel array of light sensor C1 at a time $t_1$, the light sensor C2 generates event $ev(i_{ic2}, t2)$ for a pixel having an address expressed as index $i_{ic2}$ at coordinates $(x_{ic2}, y_{ic2})$ in the pixel array of light sensor C2 at a time $t_2$, . . . , and the light sensor Cn generates event $ev(i_{cn}, t_n)$ for a pixel having an address expressed as index $i_{cn}$ at coordinates $(x_{icn}, y_{icn})$ in the pixel array of light sensor Cn at a time $t_n$. In particular, it could be one pixel or a group or a spot of pixels adjacent to each other in a light sensor in response to the marker, and the events $ev(i_{c1}, t_1)$ $ev(i_{ic2}, t_2)$ . . . $ev(i_{cn}, t_n)$ may respectively contain a set of events generated by each light sensor. These events can be continuously generated in response to a maker presence in each event-based sensor.

Usually, a group of adjacent pixels detect the marker, and the respective events $ev(i_{c1}, t_1)$, $ev(i_{ic2}, t_2)$ . . . $ev(i_{cn}, t_n)$ from the group of pixels in each light sensor then can be separately clustered as clusters CL1, CL2 . . . CLn. Based on the clustering, the marker and its 2D apparent trajectory can be detected and tracked in each sensor. The set of marker tracks detected by each light sensor, with the corresponding trajectories having 2D positions and timestamps, is then processed globally to find correspondences across those light sensors C1, C2 . . . Cn.

These correspondences are made using a data association step based on temporal and geometric constraints, allowing the system to detect and discard spurious candidate tracks, validate consistent ones and assign unique ID to a confirmed marker. For example, if there is a timing coincidence between events from C1, C2 . . . Cn, i.e. if the time difference between $t_1$, $t_2$ . . . and $t_n$ are less than 1 millisecond a timing coincidence is detected, so that correspondences are found among these events. This means events $ev(i_{c1}, t_1)$, $ev(i_{ic2}, t_2)$ . . . $ev(i_{cn}, t_n)$ and their corresponding clusters CL1, CL2 . . . CLn relate to a common marker. A set of 2D positions in each sensor for this common marker can then be processed to triangulate its 3D position.

New markers can also be processed in a simple manner. For example, they can be processed by clustering events generated in a small neighbourhood of pixels. A new track can then be created once the cluster reaches a predefined size and/or displays a motion which can be distinguished from the background noise. Alternatively, in case of active markers, it is also possible to encode a unique ID using a specific blinking frequency or a pseudo random blinking pattern for each marker or part of the markers. The microsecond accuracy of the event-based light sensor allows decoding the frequency of each marker, which can be used to further improve the reliability of the detection and/or to match the detections across sensors.

A more detailed exemplary implementation of detecting and tracking a marker is now discussed with reference to FIGS. 4a to 4f, which show a marker 41 observed and tracked by three event-based light sensors C1, C2, and C3 in 2D coordinates and its 3D position is triangulated at every update of the 2D tracks.

Figure 4:
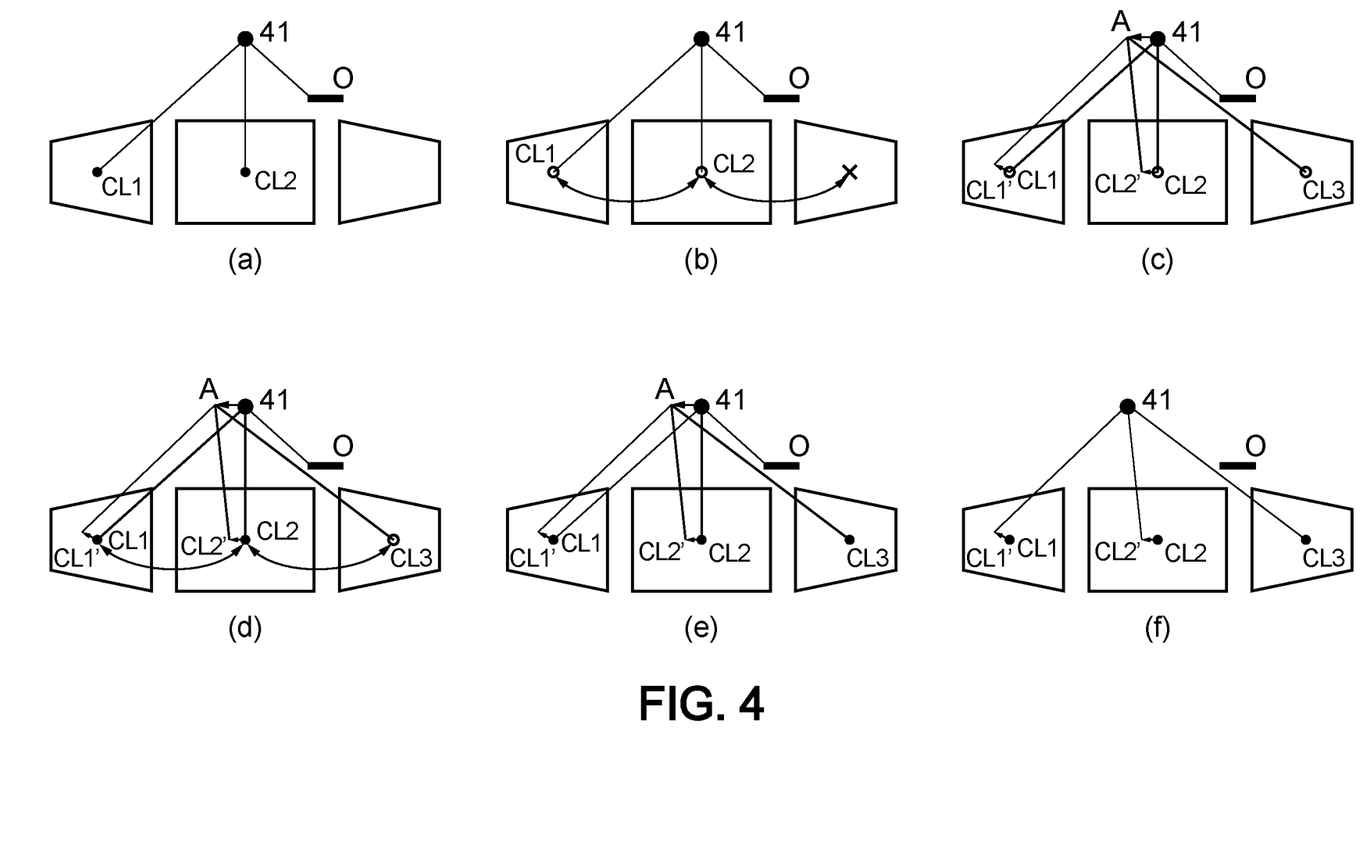

At the beginning, as shown in FIG. 4a, when a marker 41 appears in the acquisition volume, sensors C1, C2 and C3 that view the marker 41 may separately generate event clusters. In FIG. 4a, sensors C1 and C2 view the marker 41 and sensor C3 cannot view the marker 41 due to an occluding obstacle O. Therefore, at first, only sensors C1 and C2 generate event clusters CL1 and CL2 corresponding to the marker 41.

Once a cluster of events in each sensor reaches a pre-set size, the system uses geometrical constraints, such as epipolar geometry, to check if the cluster in one sensor corresponds to another one in one or more other sensors. In addition, it is also possible to further check the timing coincidence between the events in each sensor as mentioned above, to determine if they originate from one common marker. As shown in FIG. 4b, the clusters CL1, CL2 generated by sensors C1 and C2 are determined to correspond to each other, i.e. originating from the same marker. Since no cluster is generated in sensor C3, no cluster corresponds to the clusters CL1, CL2 generated in sensors C1 and C2. Accordingly, the marker 41 is triangulated from the sensors C1 and C2 in which it is visible.

As shown in FIG. 4c, when the cluster CL1 in sensor C1 corresponds to a cluster CL2 of sensor C2, a 2D track of the marker 41 in sensors C1 and C2 is created.

Afterwards, the 2D track can be maintained by monitoring new events received in a given spatial neighbourhood of the last known 2D position of this marker 41 in each sensor, when the marker 41 is moving in direction A. For example, new events clusters in each sensor including cluster CL1' in sensor C1, cluster CL2' in sensor C2, and cluster CL3 in sensor C3 (when the marker 41 is no longer invisible in sensor C3 due to the occluding obstacle) are received. They can belong to the actual movement of the marker 41 or to noise, hence a candidate 2D motion for this marker 41 is created separately in each sensor.

Then, as shown in FIG. 4d, if this candidate 2D motion represented by the cluster CL3 in sensor C3 where the marker 41 was not visible is corresponding in terms of geometrical and temporal constraints with the candidate 2D motions represented by clusters CL1' and CL2' observed in sensors C1 and C2 where the marker was visible, a new 2D track is created in sensor C3 for the considered marker 41, as shown in FIG. 4e. This can be used to, for example, process disocclusion of the considered marker in one of the sensors.

Once the 2D tracks have been updated and checked to be corresponding with each other, a new 3D position of the marker 41 represented by its 3D coordinates is triangulated, as shown in FIG. 4f.

Alternatively, it is also possible to track the marker in 3D coordinates and to use the 3D coordinates to simplify the matching of 2D tracks across sensors in a similar hardware setting, as illustrated in FIGS. 5a to 5f, where in the beginning the marker 41 is visible in sensors C1 and C2, and is not visible in sensor C3 due to the occluding obstacle.

Figure 5:
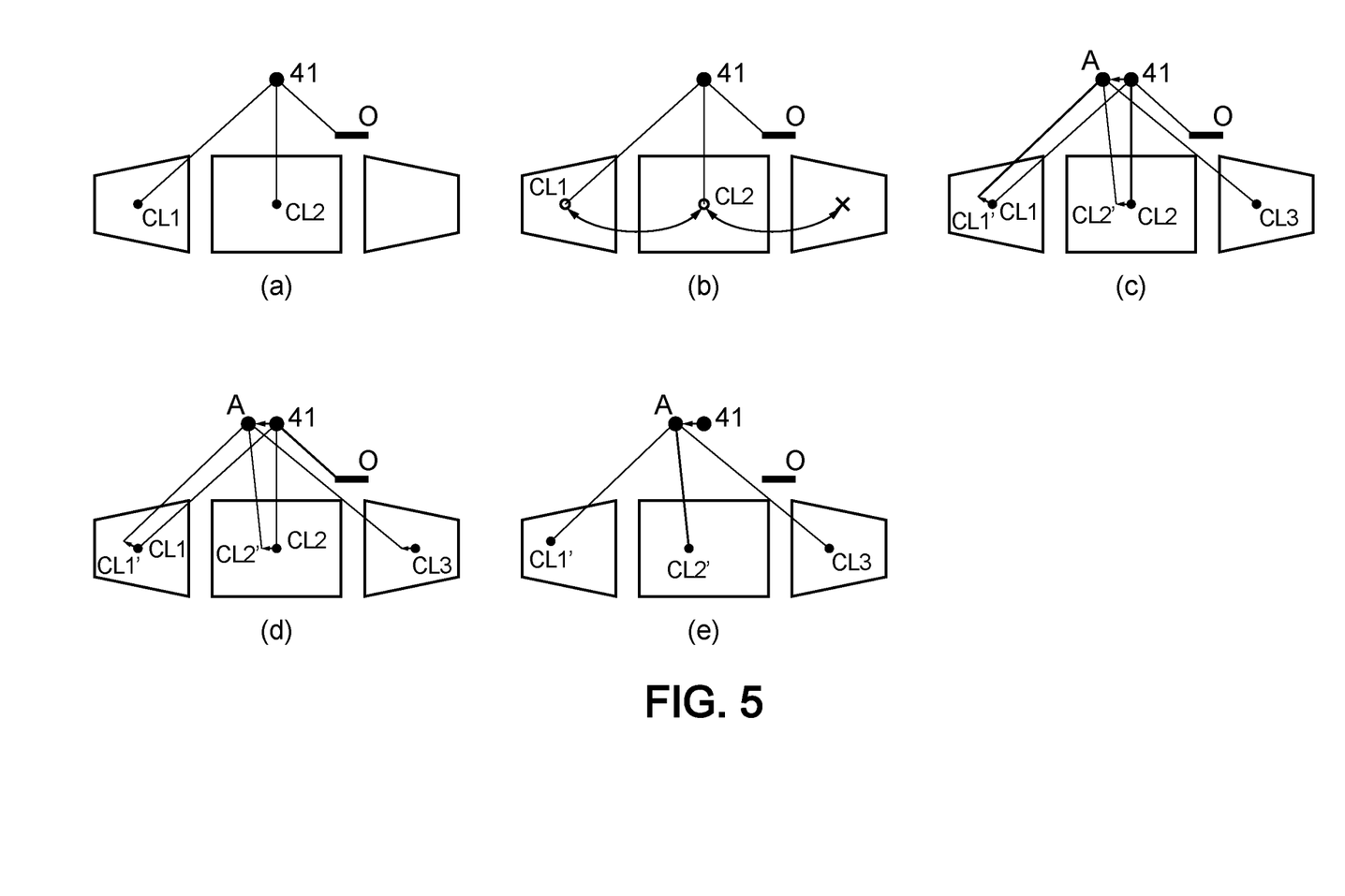

3D tracks can be initialized similarly than in the above-mentioned example of 2D tracking in FIGS. 4a-4b, i.e. using event clustering separately in each sensor and checking their correspondence when the clusters are of sufficient size and/or have a timing coincidence, as shown FIGS. 5a-5b. Clusters CL1 and CL2 are generated respectively in sensors C1 and C2, and their correspondences are checked. Different from the 2D tracking, after the correspondence checking, a further step of triangulation is applied on the clusters CL1 and CL2 in sensors C1 and C2. Therefore, the marker tracks are then maintained in 3D coordinates rather than in 2D coordinates.

Based on the past 3D coordinates or positions, as shown in FIG. 5c, the 3D speed and acceleration of the marker 41 can be estimated, so as to predict its expected future 3D position of the marker 41.

In this regard, the last known 3D position of the considered marker 41 and the predicted one can be projected in all sensors, not only in sensors C1 and C2 where the marker was visible, but also in sensor C3 where the marker was not visible due to the obstacle O. When the marker 41 can be viewed by sensor C3, as shown in FIG. 5c, the new event cluster CL3 is generated, which is close to or overlap the predicted projection in sensor C3. Then, it is possible to monitor new event clusters CL1', CL2', CL3 received in a spatial neighborhood around the projection to identify candidate 2D motions in each sensor, as shown in FIG. 5d.

It is then possible to use a robust optimization algorithm to estimate the new 3D position best explaining the observed 2D motions and simultaneously detecting the spurious 2D motion candidates, as shown in FIG. 5e.

Advantageously, the use of event-based light sensors in place of frame-based cameras has a direct impact on the temporal resolution of the system. With the arrangement mentioned above, stereo 3D reconstruction has been shown to run at around 1 kHz, which is already a 10× improvement compared to existing commercial motion capture systems. This enables the present invention to capture high speed movement, such as the movement of a swinging golf club head carrying one or more markers.

The event-based light sensors enable a marker tracking based on nearest neighbor approaches in the spacetime. The events generated by a moving marker should be close in time and image plane space (events are typically measured with the accuracy of microsecond). The method to implement this kind of motion capture is relatively simple, and the amount of unnecessary computation is reduced to a minimum. Combined with the increase of the running frequency, this leads to a significant improvement on the measurement latency compared to commercial systems in the art.

Moreover, event-based light sensors lead to significant reductions of the power consumption compared to conventional frame-based cameras. When the system is still, the detection and tracking method can leverage the sparsity of event-based data in an extremely efficient way, leading to a reduction of the overall computational power required by the system.

The above-described method may be implemented using program instructions recorded in non-transitory computer-readable media to implement various operations which may be performed by a computer. The media may also include, alone or in combination with the program instructions, data files, data structures, and the like. The program instructions recorded on the media may be those specially designed and constructed for the purposes of the illustrative embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one.

Implementations of the invention may be used in many applications including computer human interaction (e.g., recognition of gestures, posture, face, and/or other applications), controlling processes (e.g., an industrial robot, autonomous and other vehicles), following movements of a set of interest points or objects (e.g., vehicles or humans) in the visual scene and with respect to the image plane, augmented reality applications, virtual reality applications, access control (e.g., opening a door based on a gesture, opening an access way based on detection of an authorized person), detecting events (e.g., for visual surveillance or people or animal), counting, tracking, etc. Myriads of other applications exist that will be recognized by those of ordinary skilled in the art given the present disclosure.

The embodiments described hereinabove are illustrations of this invention. Various modifications can be made to them without leaving the scope of the invention which stems from the annexed claims.

The invention claimed is:

1. A method for capturing motion of an object, the method comprising:
installing at least one marker on the object;
bringing the object having the at least one marker installed thereon in an acquisition volume;
arranging at least two event-based light sensors such that respective fields of view of the at least two event-based light sensors cover the acquisition volume, wherein each event-based light sensor has an array of pixels;
receiving events asynchronously from the pixels of the at least two event-based light sensors depending on variations of incident light from the at least one marker sensed by the pixels; and
processing the events to position the at least one marker within the acquisition volume and capture motion of the object, wherein processing the events comprises:
determining that events received from respective pixels of the at least two event-based light sensors relate to a common marker based on detection of a timing coincidence between said events;
determining a position of the common marker based on 2D pixel coordinates of the respective pixels from which the events having the detected timing coincidence therebetween are received, wherein the timing coincidence is detected between events having a time difference of less than 1 millisecond between them; and
mapping 3D coordinates in the acquisition volume to 2D pixel coordinates in each of the event-based light sensors,
wherein determining the position of the common marker comprises obtaining 3D coordinates of the common marker that are mapped to the 2D pixel coordinates of the respective pixels from which the events having the detected timing coincidence therebetween are received.

2. The method of claim 1, wherein the at least one marker comprises an active marker adapted to emit light, preferably infrared light.

3. The method of claim 2, wherein the at least one marker is configured to emit a pseudo random blinking pattern.

4. The method of claim 1, wherein the at least one marker comprises a passive reflector, the method further comprising illuminating the acquisition volume with external light.

5. The method of claim 4, wherein the external light is infrared light.

6. The method of claim 1, wherein the at least one marker is configured to emit or reflect light having wavelength characteristics and the at least two event-based light sensors are provided with optical filters to filter out light not having the wavelength characteristics.

7. The method of claim 1, wherein the at least two event-based light sensors are fixed to a common rigid structure and the common rigid structure is moveable following a movement path of the object.

8. A motion capture system, comprising:
at least one marker to be carried by an object in an acquisition volume;
at least two event-based light sensors having respective fields of view covering the acquisition volume, wherein each event-based light sensor has an array of pixels configured to asynchronously generate events depending on variations of incident light from the at least one marker sensed by the pixels; and
a computing device coupled to the at least two event-based light sensors to process the events to position the at least one marker within the acquisition volume and capture motion of the object, wherein processing the events comprises:
determining that events received from respective pixels of the at least two event-based light sensors relate to a common marker based on detection of a timing coincidence between said events;
determining a position of the common marker based on 2D pixel coordinates of the respective pixels from which the events having the detected timing coincidence therebetween are received,
wherein the timing coincidence is detected between events having a time difference of less than 1 millisecond between them; and
mapping 3D coordinates in the acquisition volume to 2D pixel coordinates in each of the event-based light sensors,
wherein determining the position of the common marker comprises obtaining 3D coordinates of the common marker that are mapped to the 2D pixel coordinates of the respective pixels from which the events having the detected timing coincidence therebetween are received.

9. The motion capture system according to claim 8, wherein the at least one marker comprises an active marker which is adapted to emit light, preferably infrared light.

10. The motion capture system according to claim 9, wherein the at least one marker is configured to emit a pseudo random blinking pattern.

11. The motion capture system according to claim 8, wherein the at least one marker comprises a passive reflector, the motion capture system further at least one light source to illuminate the acquisition volume with external light.

12. The motion capture system according to claim 11, wherein the external light is infrared light.

* * * * *